A. IZEN & R. ROSEN.
RESILIENT WHEEL.
APPLICATION FILED OCT. 23, 1915.
1,198,233.
Patented Sept. 12, 1916.
2 SHEETS—SHEET 1.
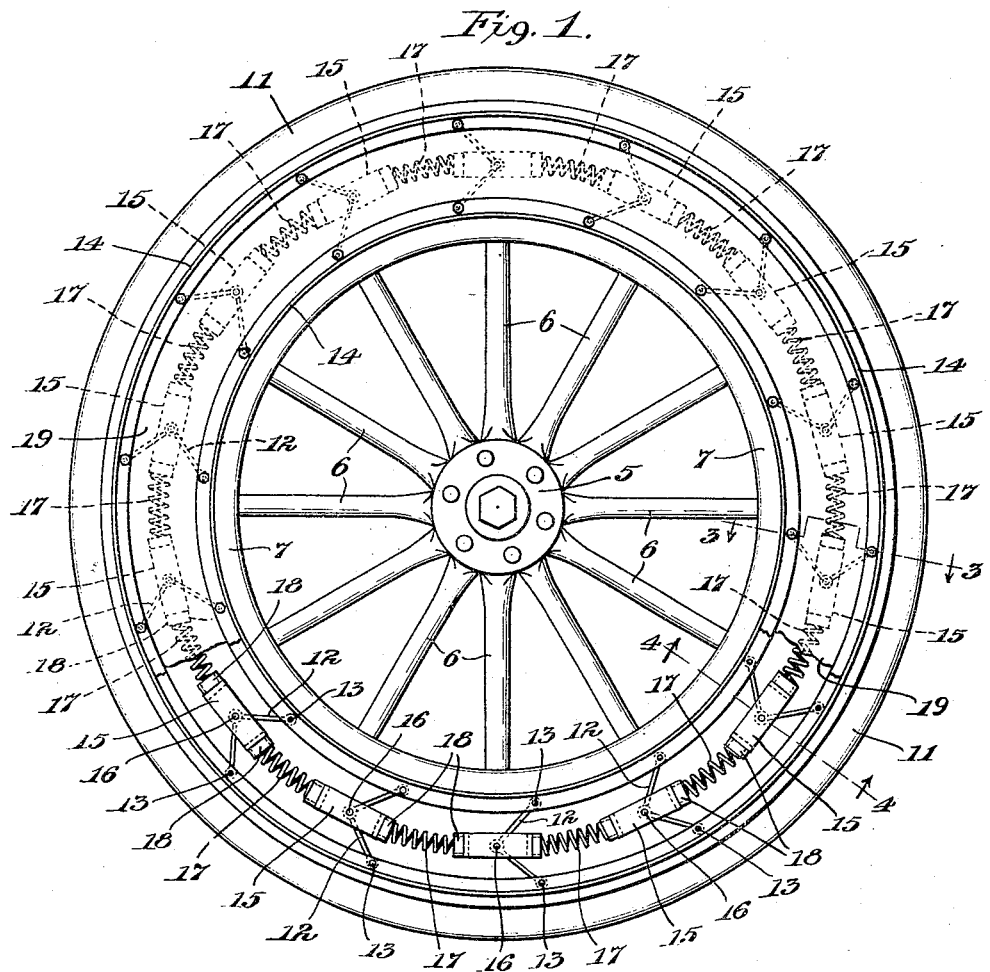
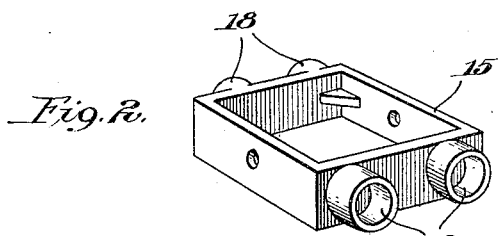
Witnesses:
H. S. Bull
A. A. Olson
Inventors,
Alexander Izen,
and Ruben Rosen,
by [signature]
Their Attorney.

A. IZEN & R. ROSEN.
RESILIENT WHEEL.
APPLICATION FILED OCT. 23, 1915.
1,198,233.
Patented Sept. 12, 1916.
2 SHEETS—SHEET 2.
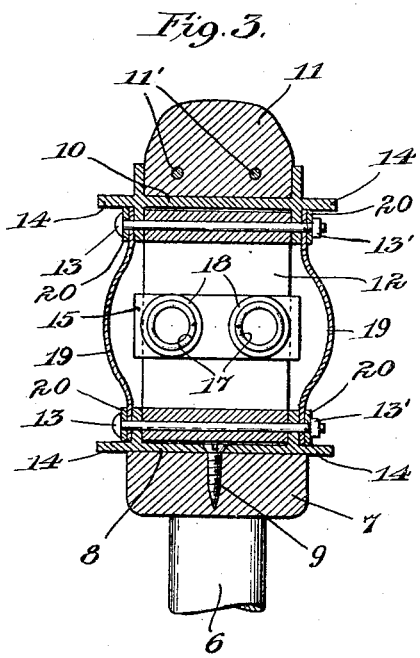
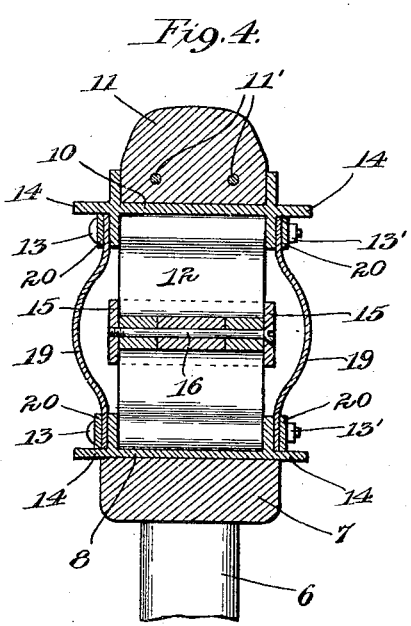
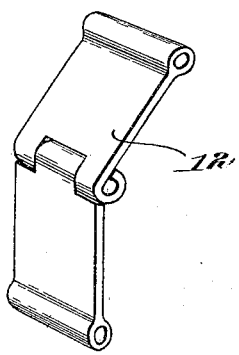
Witnesses:
Inventors,
Alexander Izen,
and Ruben Rosen,
by Joshua R H Lowe
Their Attorney.

UNITED STATES PATENT OFFICE.

ALEXANDER IZEN AND RUBEN ROSEN, OF CHICAGO, ILLINOIS.

RESILIENT WHEEL.

1,198,233.  Specification of Letters Patent.  Patented Sept. 12, 1916.

Application filed October 23, 1915. Serial No. 57,454.

*To all whom it may concern:*

Be it known that we, ALEXANDER IZEN and RUBEN ROSEN, subjects of the Czar of Russia, and residents of the city of Chicago, county of Cook, and State of Illinois, have jointly invented certain new and useful Improvements in Resilient Wheels, of which the following is a specification.

Our invention relates to improvements in resilient wheels, and has for its object the production of a resilient wheel which will avoid the use of pneumatic tires, but at the same time possess the resiliency which is incident to the use of pneumatic tires.

A further object is the production of a resilient wheel which will be of simple construction and efficient in use.

Other objects will appear hereinafter.

With these objects in view, the invention consists in the combinations and arrangements of parts hereinafter described and claimed.

The invention will be best understood by reference to the accompanying drawings forming a part of this specification, and in which, Figure 1 is a side elevation of a resilient wheel embodying the invention, portions thereof being broken away to expose underlying parts, Fig. 2 is a perspective view of one of the spring-seat members employed in the construction, Figs. 3 and 4 are enlarged sections taken on lines 3—3 and 4—4 respectively of Fig. 1, and Fig. 5 is a perspective view of one of the toggle members employed in the construction.

The preferred form of construction, as illustrated in the drawings comprises a wheel consisting of a hub 5 from which extend radial spokes 6. The outer ends of spokes 6 are rigidly connected by a rim member 7 upon the periphery of which is arranged an annular metallic channel member 8 secured thereto by screws 9.

Surrounding the member 8 is an annular rim member 10 of such diameter as to result in the formation of an annular space between said parts. The member 10 is formed with external and internal channels, as shown, a tire 11 preferably of solid rubber or other suitable material being mounted in the external channel and secured in position therein by cables or wires 11'.

Arranged in the annular space between the members 8 and 10 is a plurality of toggles 12 the respective ends of which are positioned in the channels at the adjacent sides of said members and pivotally secured thereto by means of bolts 13 and coöperating nuts 13'. In order to protect the ends of said bolts, annular laterally projecting flanges 14 are formed upon the parts 8 and 10, as clearly shown in Figs. 3 and 4, the outer edges of said flanges projecting beyond the ends of said bolts and thus serving as a means of protection for the same.

The parts of each toggle 12 are hingedly connected together to form the knee joint thereof, and coöperating with each toggle is a rectangular frame 15 pivotally secured to the toggle by means of the pintle 16 of the knee joint, as clearly shown in Fig. 4. Interposed between the adjacent ends of adjacent members 15 are helical springs 17, the ends of which are securely fastened in seats or recesses 18 formed at the respective ends of said members 15.

With the construction set forth, it will be seen that in use any weight or load upon the wheel will be transmitted to the toggles 12 and the springs 17 coöperating therewith and thus said springs will serve to absorb any shocks or jars to which the wheel is subjected, filling the same function as the air in a pneumatic tire. The arrangement is such also, that where the wheel is used for driving, considerable power will be saved through the action of the springs and toggles. In order to close the annular space between the parts 8 and 10 so as to exclude dust and foreign matter therefrom, sheets 19 of suitable elastic material are fastened to the sides of the members 8 and 10 spanning the sides of said annular space, said members 19 being secured in position by bands 20 held in position by bolts 13 and nuts 13'.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having described our invention what we claim as new and desire to secure by Letters Patent is:

A resilient wheel comprising a rim consisting of two concentric parts having an intervening annular space between them; a plurality of toggles arranged in said space having their ends pivotally connected with said rim parts; a substantially rectangular frame carried by each of said toggles at the knee joint therein; recesses provided in the ends of each frame; and springs interposed between and connecting adjacent frames, the ends of said springs engaging in said recesses, substantially as described.

In testimony whereof we have signed our names to this specification in the presence of two subscribing witnesses.

ALEXANDER IZEN.
RUBEN ROSEN.

Witnesses:
JOSHUA R. H. POTTS,
HELEN F. LILLIS.